United States Patent [19]

Maida

[11] 4,072,962
[45] Feb. 7, 1978

[54] METERING DEVICE

[75] Inventor: Osamu Maida, Tokyo, Japan

[73] Assignee: Nippon Kogaku K.K., Tokyo, Japan

[21] Appl. No.: 700,849

[22] Filed: June 29, 1976

[30] Foreign Application Priority Data

July 3, 1975 Japan .................................. 50-81449
July 24, 1975 Japan .................................. 50-89610

[51] Int. Cl.² .......................... G03B 7/08; G05B 1/06; G01J 1/42; H03K 5/20
[52] U.S. Cl. ...................................... 354/24; 354/43; 354/44; 354/51; 352/141; 356/223; 307/357; 318/640
[58] Field of Search ...................... 354/24, 26, 29, 36, 354/38, 42, 43, 44, 50, 51, 60 R, 271; 352/141; 356/223; 318/480, 640, 641; 307/235 H, 235 T, 235 F

[56] References Cited

U.S. PATENT DOCUMENTS

| | | | |
|---|---|---|---|
| 3,747,487 | 7/1973 | Tanikoshi | 352/141 X |
| 3,776,111 | 12/1973 | Maida | 352/141 |
| 3,798,662 | 3/1974 | Suzuki | 354/24 X |
| 3,829,867 | 8/1974 | Ono | 354/29 X |
| 3,935,524 | 1/1976 | Cap et al. | 354/44 X |
| 3,936,842 | 2/1976 | Narba et al. | 354/24 |
| 3,977,011 | 8/1976 | Matsuda | 352/24 |

Primary Examiner—L. T. Hix
Assistant Examiner—William B. Perkey
Attorney, Agent, or Firm—Fitzpatrick, Cella, Harper & Scinto

[57] ABSTRACT

A metering device comprises a photoelectric converter circuit for generating a first voltage corresponding to the brightness of a subject to be photographed. The converter circuit includes a photoelectric converter element and a first conductor element for logarithmically converting the output of the photoelectric converter element. The device further comprises a voltage generating circuit including a second semiconductor element and a current source for flowing a current proportional to an absolute temperature to a resistor connected in series to the second semiconductor element. The voltage generating circuit is effective to generate a second voltage comprising the sum of the voltages generated in the resistor and the second conductor element. The difference between the first and the second voltage is put out by a differential amplifier. A third voltage proportional to the absolute temperature is put out by a voltage generating circuit, and the third voltage and the output voltage of the differential amplifier are compared by a comparator circuit. Means is provided for equalizing the output voltage of the differential amplifier and the third voltage by the output of the comparator circuit.

9 Claims, 7 Drawing Figures

| T2 / X | (−20°C) 253 | (0°C) 273 | (40°C) 313 | (60°C) 333 |
|---|---|---|---|---|
| 0.98 | −0.325 | −0.151 | +0.133 | +0.252 |
| 0.99 | −0.217 | −0.102 | +0.090 | +0.171 |
| 1.00 | −0.110 | −0.052 | +0.047 | +0.090 |
| 1.01 | −0.003 | −0.002 | +0.004 | +0.009 |
| 1.02 | +0.104 | +0.047 | −0.039 | −0.037 |
| 1.03 | +0.211 | +0.097 | −0.083 | −0.157 |

METERING DEVICE

BACKGROUND OF THE INVENTION

1. Field of the Invention

This invention relates to a metering device in a camera or the like, and more particularly to such a metering device in which temperature compensation is provided.

2. Description of the Prior Art

With a metering device, the brightness of the subject to be photographed has heretofore been measured by utilizing the logarithmic characteristic of a diode or a transistor for a current corresponding to the brightness of the subject to logarithmically compress the wide dynamic range of the brightness of the subject.

However, there is a disadvantage in that the logarithmic characteristic of the semiconductor element such as a diode, transistor or the like is dependent on temperature and the measured value is variable for temperature variation.

SUMMARY OF THE INVENTION

It is an object of the present invention to provide a metering device in which changes in the logarithmic characteristic of a diode or a transistor resulting from temperature variations may be compensated for to provide stable metering for temperature variations.

According to the present invention, the metering device comprises a photoelectric converter circuit for generating a first voltage corresponding to the brightness of a subject to be photographed, the photoelectric converter circuit including a photoelectric converter element and a first conductor element for logarithmically converting the output of the photoelectric converter element, a voltage generating circuit including a second semiconductor element and a current source for providing a current proportional to an absolute temperature to a resistor connected in series with said second semiconductor element, said voltage generating circuit being effective to generate a second voltage comprising the sum of the voltage generated in the resistor and the second conductor element, a differential amplifier for amplifying the voltage difference between the first and the second voltage, a voltage generating circuit for putting out a third voltage proportional to the absolute temperature, a comparator circuit for comparing the output voltage of the differential amplifier with the third voltage, and means for equalizing the output voltage of the differential amplifier and the third voltage by the output of the comparator circuit.

Other objects and features of the present invention will become fully apparent from the following detailed description of some embodiments taken in conjunction with the accompanying drawings.

DESCRIPTION OF THE PREFERRED EMBODIMENTS

Figure 1:
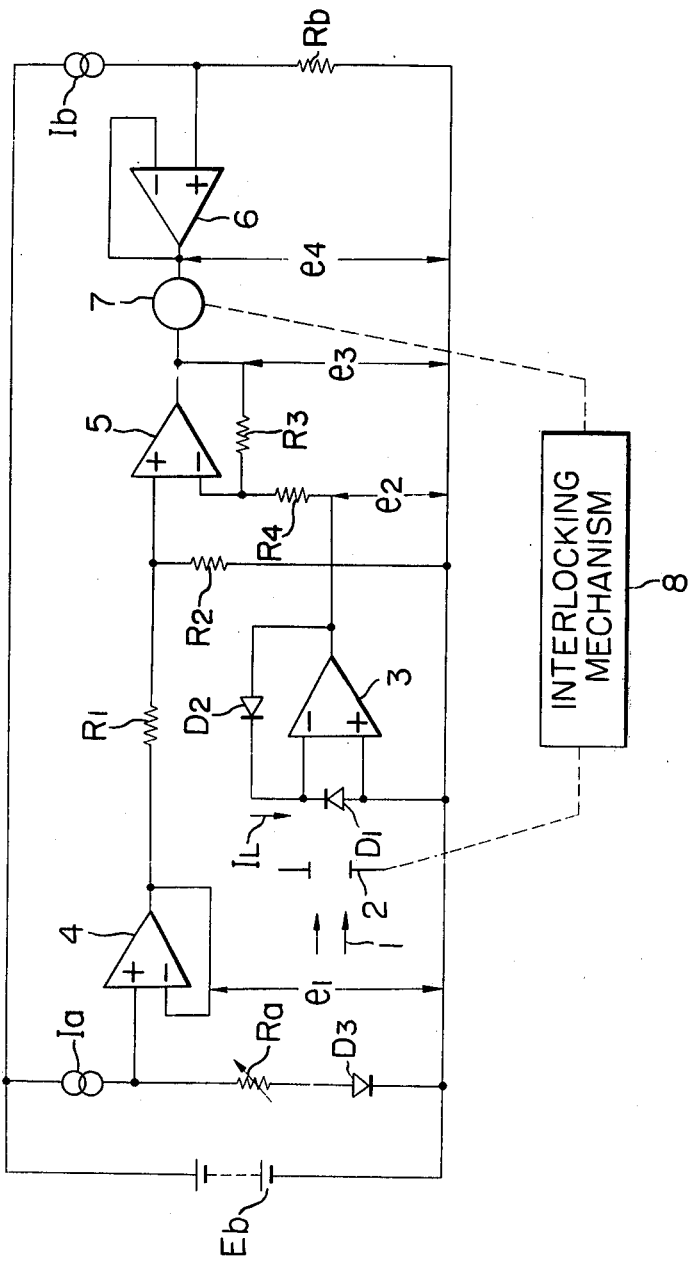
FIG. 1 is a circuit diagram of a first and a fourth embodiment of the present invention.

Referring to FIG. 1 which shows a circuit diagram of a first embodiment of the present invention, a current source Ia for generating a current proportional to an absolute temperature, a variable resistor Ra for introducing the values of exposure determining factors such as film sensitivity, shutter speed, etc., and a diode D3 are series-connected to the opposite terminals of a power source Eb. The output current from the current source Ia flows to the variable resistor Ra and the diode D3. Connected to the junction between the current source Ia and the variable resistor Ra is the non-inverting input terminal of an operational amplifier 4 having its output terminal and inverting input terminal connected together. The operational amplifier 4 constitutes a voltage follower which transmits a voltage generated by the variable resistor $Ra$ and the diode D3 to a low impedance load circuit. Connected between the inverting input terminal and the non-inverting input terminal of an operational amplifier 3 is a photodiode D1 as a photoelectric converter element, and connected between the output terminal and the inverting input terminal of the operational amplifier 3 is a logarithmic compression diode D2. The operating amplifier 3 and the diodes D1 and D2 together constitute a photoelectric converter circuit. The light entering from a subject through a stop device 2 is directed to the photodiode D1 and to an unshown film, always with a predetermined ratio of illuminations, by an unshown beam splitter.

A photocurrent $I_L$ generated in the photodiode D1 is proportional to the intensity of illumination imparted thereto because the opposite ends of the diode D1 are in false short-circuited condition. The photocurrent $I_L$ is logarithmically compressed by the operational amplifier 3 and the logarithmic compression diode D2, so that a voltage resulting from the logarithmic compression of the photocurrent $I_L$ is produced at the output terminal of the operational amplifier 3. The non-inverting input terminal of an operational amplifier 5 is connected to the output terminal of the operational amplifier 4 through the resistor R1, the inverting input terminal of the operational amplifier 5 is connected to the output terminal of the operational amplifier 3 through the resistor R4, and the output terminal of the operational amplifier 5 is connected to the inverting input terminal of the operational amplifier 5 through the resistor R3. The operational amplifier 5 and the resistors R1, R2, R3 and R4 together constitute a differential amplifier which amplifies the voltage differential between the voltage $e_1$ and $e_2$. A resistor $Rb$ is series-connected to a current source Ib which, like the current source Ia, generates a current proportional to the absolute temperature, so that a voltage proportional to the absolute temperature is generated across the resistor $Rb$. The non-inverting input terminal of an operational amplifier 6 is connected to the junction between the current source Ib and the resistor $Rb$ and the inverting input terminal of the operational amplifier 6 is connected to the output terminal of the same operational amplifier, thus constituting a voltage follower which transmits the voltage produced across the resistor $Rb$ to the low impedance load. Connected between the outputs of the operational amplifiers 5 and 6 is a DC motor 7 which acts as a comparator circuit and may revolve in either normal or reverse direction in accordance with the direction of any potential difference present between the two outputs. Alternatively, the DC motor 7 may be other electromechanical converter such as DC meter whose mechanical output is reversed in accordance with the direction of the current. The driving output of the motor 7 is transmitted to the stop device 2 by an interlocking mechanism 8 to control the stop.

The output current $Ia_1$ of the current source proportional to the absolute temperature is expressed as:

$$Ia_1 = \alpha_1 T,$$

where $\alpha_1$ is a constant and T is the absolute temperature.

The output voltage $e_1$ of the operational amplifier 4 is expressed as:

$$e_1 = R a \alpha_1 T + \frac{kT}{q} \ln \frac{\alpha_1 T}{Is_1} \quad (1),$$

where $\alpha_1 T \gg Is_1$, $k$ is Boltzmann's constant, $q$ the primary quantity of charged electrons and $Is_1$ the reverse saturation current of the diode D3.

The output voltage $e_2$ of the operational amplifier 3 is expressed as:

$$e_2 = \frac{kT}{q} \ln \frac{I_L}{Is_2} \quad (2),$$

where $I_L \gg Is_2$ and $Is_2$ is the reverse saturation current of the diode D2.

The output voltage $e_3$ of the operational amplifier 5 is expressed as:

$$e_3 = G(e_1 - e_2) \quad (3),$$

where $G = R_3/R_4 = R_2/R_1$. By equations (1), (2) and (3), the following relation is given:

$$e_3 = GT(\alpha_1 Ra + \frac{k}{q} \ln \frac{\alpha_1 T}{I_L} \cdot \frac{Is_2}{Is_1}) \quad (4)$$

Assuming that diodes D2 and D3 differ only in their junction areas and are identical in the other characteristics, $Is_2/Is_1$ is equal to the ratio of their junction areas and hence, $$Is_2/Is_1 = S_1$$

Therefore, equation (4) may be rewritten:

$$e_3 = GT(\alpha_1 Ra + \frac{k}{q} \ln \frac{\alpha_1 T}{I_L} \cdot S_1 \quad (5)$$

The output current $Ib_1$ of the current source $Ib$ proportional to the absolute temperature is:

$$Ib_1 = \alpha_2 T,$$

where $\alpha_2$ is a constant.

The output voltage $e_4$ of the operational amplifier 6 is expressed as:

$$e_4 = Rb \alpha_2 T \quad (6)$$

By the difference between $e_3$ and $e_4$, the motor 7 is rotated and in order to bring about a relation $e_3 = e_4$, a negative feedback is imparted to $e_4$ from the motor 7, the interlocking mechanism 8 and the stop device 2 so that the photocurrent $I_L$ may be constant, namely, that the intensity of illumination on the photodiode D1 may be constant. Thus, the relation that $e_3 = e_4$ is always ensured.

From equations (5) and (6), the following relation is obtained:

$$GT(\alpha_1 Ra + \frac{k}{q} \ln \frac{\alpha_1 T}{I_L} \cdot S_1) = Rb\alpha_2 T \quad (7)$$

Thus, the following is derived from equation (7).

$$I_L = \alpha_1 TS_1 \exp \frac{q}{k}(\alpha_1 Ra - \frac{\alpha_2 Rb}{G}) \quad (7')$$

Since the photocurrent, namely, the intensity of illumination on the surface of the photodiode, is controlled so as to satisfy equation (7'), appropriate intensity of illumination on the film surface may always be ensured by varying the variable resistor $Ra$ in accordance with film sensitivity, shutter time, etc. As shown by equation (7'), the exposure determining factors need not always be introduced through the variable resistor $Ra$ but may also be introduced through $Rb$, $\alpha_1$ and $\alpha_2$. Equation (7') includes T representing the temperature-dependency, but this has very little influence. More specifically, assuming that the photocurrent is proportional to the intensity of illumination on the photodiode D1 without being varied by temperature, the variation $\Delta Ev$ with temperature in exposure value of the film surface illumination controlled as in equation (7') will be expressed as:

$$\Delta Ev = \frac{\ln \frac{I_L(T_2)}{I_L(T_1)}}{\ln 2} \quad (8)$$

From equations (7') and (8'), the following equation is obtained:

$$\Delta Ev = \frac{\ln \frac{T_2}{T_1}}{\ln 2} \quad (9)$$

By equation (9), variations in exposure level at $T_2 = 333$ (60° C) and $T = 253$ (−20° C) with respect to the referential exposure level of $T_1 = 293$ (20° C) may be given thus:

$$\Delta Ev (T = 333) = 0.18$$

$$\Delta Ev (T = 253) = -0.21$$

Thus, an overexposure by 0.18 step occurs for 60° C and an overexposure by 0.21 step occurs for −20° C, and these variations can be regarded as being small in terms of the photographic effect.

The necessary amount of variation $\Delta Ra$ in value of the variable resistor $Ra$ to change the exposure level by one step is:

$$\Delta Ra = (k/\alpha_1 q) \ln 2 \quad (10)$$

The variable resistor $Ra$ through which the exposure determining factors are introduced need not be a complicated function resistor but may be a variable resistor which will be linearly variable.

As already described, the first embodiment of the present invention is such that:

(1) The diode D3 similar to the diode D2 is used and as shown by equation (5), the difference $e_3$ between $e_1$ and $e_2$ is detected to bring about $Is_2/Is_1 = S_1$ ($S_1$ is constant), whereby the term of the reverse saturation current $Is_2$ of the diode D2 affected by temperature variation has no relation to temperature variation; and (2) The current $\alpha_1 T$ proportional to the absolute temperature flows to the diode and as shown by equation (7), control is effected by the comparator circuit 7 so as to bring about $e_3 = e_4$, thereby eliminating the term of the logarithmic factor in $(kT/q)ln(I_L/Is_1)$ in equation (2).

However, in the first embodiment, the term of $\alpha_1 T$ affected by temperature variation still remains, but the influence of this practically offers no problem as already noted.

Figure 2:
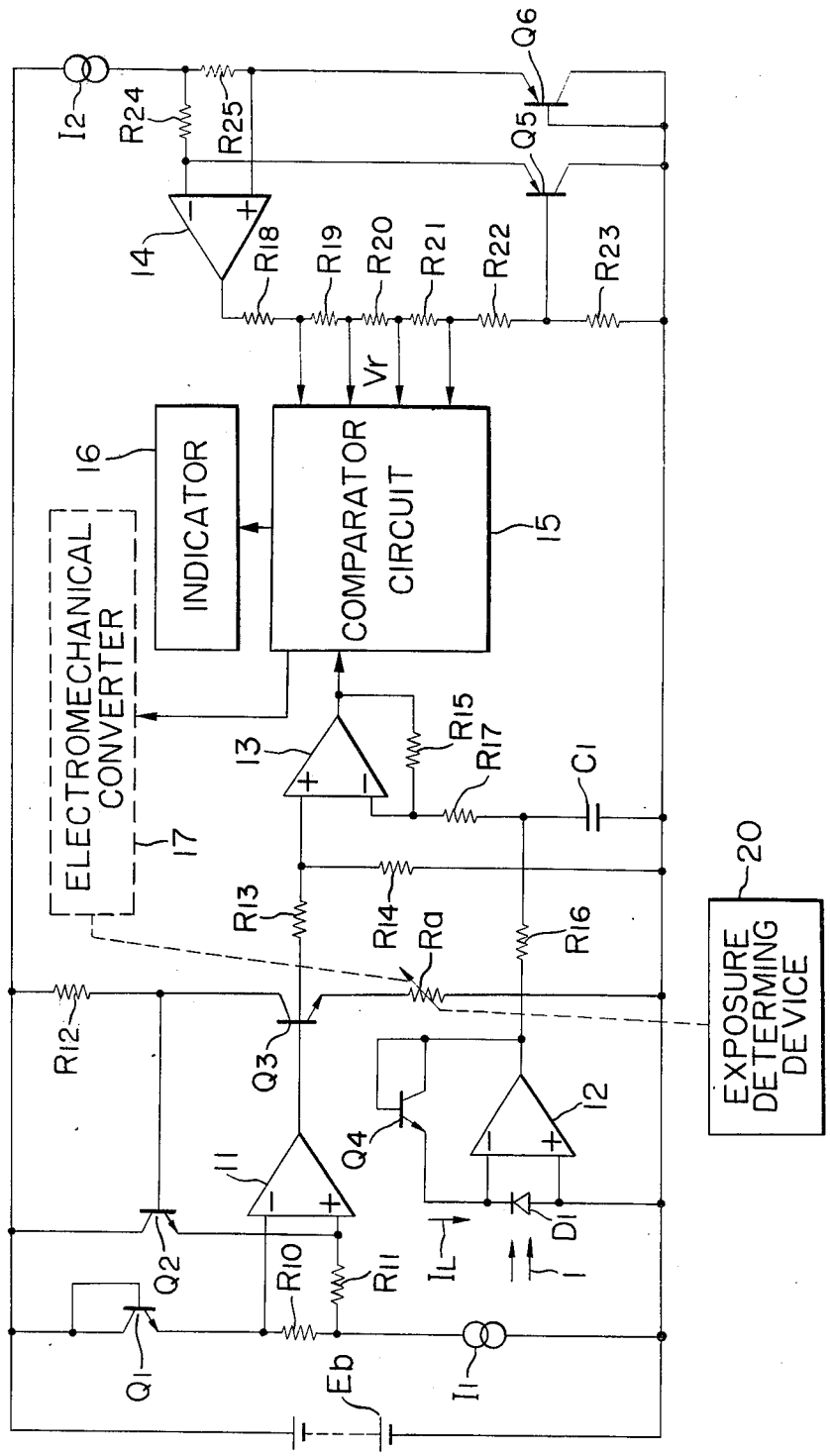
FIG. 2 is a circuit diagram of a second embodiment of the present invention.

FIG. 2 shows a second embodiment of the present invention. This figure more particularly shows the current sources $Ia$ and $Ib$ shown in FIG. 1.

In FIG. 2, a transistor Q4 having its base and collector connected together, a resistor R10 and a constant current sink $I_1$ are series-connected to a power source E$b$. The inverting input terminal of an operational amplifier 11 is connected to the junction between the resistor R10 and the collector of the transistor Q4, and the non-inverting input terminal of the operational amplifier 11 is connected through the resistor R11 to the junction between the resistor R10 and the constant current sink $I_1$. A transistor Q3 has its base connected to the output terminal of the operational amplifier 11, its collector connected to the positive terminal of the power source E$b$ through a resistor R12, and its emitter connected to the negative terminal of the power source E$b$ through a variable resistor R$a$ for introducing the exposure determining factors. A transistor Q2 has its base connected to the junction between the collector of the transistor Q3 and the resistor R12, its collector connected to the positive terminal of the power source E$b$, and its emitter connected to the non-inverting input terminal of the operational amplifier 11. The transistors Q1, Q2, Q3, the resistors R10, R11, R12, the operational amplifier 11 and the constant current sink $I_1$ together constitute a current generating circuit for generating a current proportional to the absolute temperature, as will further be described. The constant current sink $I_1$ may be a resistor without the operation being essentially changed. The base-emitter junction of the transistor Q3 replaces the diode D3 of FIG. 1. The operational amplifier 12, the photodiode D1 and the transistor Q4 together constitute a photoelectric converter circuit similar to the one already described. The operational amplifier 13 and the resistors R13, R14, R15, R16, R17 together constitute a differential amplifier circuit similar to the one already described, which amplifies the difference between the output voltages of the operational amplifiers 11 and 12. A capacitor C1 connected between the resistors R16 and R17 serves to reduce the influence of the alternating light resulting from the quick response of the photodiode D1, and the presence of the capacitor C1 has nothing to do in terms of direct current. The output of the operational amplifier 13 is applied as a common input to a plurality of comparator circuit 15.

One end of a constant current source $I_2$ is connected to the positive terminal of the power source E$b$ and the other end is connected through a resistor R25 to the emitter of a transistor Q6 having its base and collector connected to the negative terminal of the power source. The inverting input terminal of an operational amplifier 14 is connected through a resistor R24 to the junction between the constant current source $I_2$ and the resistor R25, the non-inverting input terminal of the operational amplifier 14 is connected to the junction between the resistor R25 and the emitter of the transistor Q6, and the output terminal of the operational amplifier 14 is connected to the negative terminal of the power source E$b$ through a serial connection of resistors R18, R19, R20, R21, R22 and R23. A transistor Q5 has its base connected to the junction between the resistors R22 and R23, its emitter connected to the inverting input terminal of the operational amplifier 14, and its collector connected to the negative terminal of the power source E$b$. The operational amplifier 14, the transistors Q5 and Q6, the resistors R18–R25 and the constant current source $I_2$ together constitute a voltage generating circuit for generating a voltage proportional to the absolute temperature, as will further be described. The output voltage of such voltage generating circuit is divided by the resistors R18–R23 into a plurality of different reference voltages proportional to the absolute temperature in order to indicate not only whether the exposure is proper or not but also stepwisely indicate the amount of error from the proper exposure point. These are then applied as the reference voltages to a comparator circuit 15. The comparator circuit 15 logically treats to determine to which level of the reference voltages the output voltage of the operational amplifier 13 corresponds, and transmits the treatment signal to an indicator 16. In accordance with the signal from the comparator circuit 15, the indicator 16 indicates whether the exposure is proper or not, in a predetermined manner of indication.

An exposure determining device 20, which includes a differential mechanism which receives as input the exposure factors such as shutter speed, film sensitivity and $f$-value information and is differentially operated by such input, mechanically displaces a variable resistor R$a$, and the displacement of the variable resistor R$a$ in turn displaces an unshown exposure factor introducing member of the exposure determining device 20.

An electromechanical converter 17 for effecting automatic exposure control converts the electrical signal of the comparator circuit 15 into a mechanical displacement which varies the variable resistor R$a$ to apply a negative feedback so that the output voltage of the operational amplifier 13 may correspond to a particular one of the plurality of reference voltages which determines a proper exposure.

Now, let $I_{E1}$ and $I_{E2}$ be the emitter currents of the transistors Q1 and Q2 and $I_{C3}$ be the collector current of the transistor Q3. Then, control is effected to satisfy the following relations by the operational amplifier 11:

$$I_{E1}R10 = I_{E2}R11 \tag{11}$$

$$\frac{kT}{q} \ln \frac{I_{E1}}{I_{sa}} + I_{E1}R10 = \frac{kT}{q} \ln \frac{I_{E2}}{I_{sb}} + \tag{12}$$

$$I_{E2}R11 + (\frac{I_{E2}}{1 + h_{FE2}} + I_{C3})R12$$

where $I_{E1} >> I_{sa}$, $I_{E2} >> I_{sb}$, $h_{FE2}$ is the direct current amplification factor of the transistor Q2, $I_{sa}$ the reverse saturation current in the emitter junction of the transistor Q1, and $I_{sb}$ the reverse saturation current in the emitter junction of the transistor Q2. Thus, by equations (11) and (12), the following relation is given:

$$I_{C3} = \frac{1}{R12} \cdot \frac{kT}{q} \ln \left( \frac{R11}{R10} \cdot \frac{I_{sb}}{I_{sa}} \right) - \frac{I_{E2}}{1 + h_{FE2}} \quad (13)$$

Let $I_{E3}$ and $h_{FE3}$ be the emitter current and the direct current amplification factor of the transistor Q3, respectively. Then, $$I_{E3} = I_{C3}(1 + \frac{1}{h_{FE3}}) = (1 + \frac{1}{h_{FE3}})\left\{ \frac{1}{R12} \cdot \frac{kT}{q} \ln \left( \frac{R11}{R10} \cdot \frac{I_{sb}}{I_{sa}} \right) - \frac{I_{E2}}{1 + h_{FE2}} \right\} \quad (14)$$

Assuming that the transistors Q1 and Q2 differ only in their emitter junction areas and are identical in the other characteristics, $I_{sb}/I_{sa}$ equals the ratio between the emitter junction areas and hence, $$I_{sb}/I_{sa} = S_2,$$

where $S_2$ is the ratio between the junction areas of the two transistors.

If each value is determined so that $$h_{FE3} \gg 1 \text{ and } \frac{1}{R12} \frac{kT}{q} \ln \frac{R11}{R10} S_2 \gg \frac{I_{E2}}{1 + h_{FE2}},$$

equation (14) may be rewritten thus:

$$I_{E3} = \frac{1}{R12} \cdot \frac{kT}{q} \ln \frac{R_{11}}{R_{10}} \cdot S_2 \quad (15)$$

Therefore, the emitter current $I_{E3}$ becomes a current proportional to the absolute temperature.

The output voltage $e_{11}$ of the operational amplifier 11 is expressed as:

$$e_{11} = I_{E3}Ra + \frac{kT}{q} \ln \frac{I_{E3}}{I_{sc}} \quad (16),$$

where $I_{E3} \gg I_{sc}$ and $I_{sc}$ is the reverse saturation current in the emitter junction of the transistor Q3. Since the base potential of the transistor Q3 is connected to the output of the operational amplifier 11, no disturbance is imparted to the above-described operation by the resistors R13 and R14 being connected to the transistor Q3.

The output voltage $e_{12}$ of the operational amplifier 12 is:

$$e_{12} = \frac{kT}{q} \ln \frac{I_L}{I_{sd}} \quad (17),$$

where $I_L \gg I_{sd}$ and $I_{sd}$ is the reverse saturation current in the emitter junction of the transistor Q4.

The output voltage $e_{13}$ of the operational amplifier 13 is:

$$e_{13} = G_2(e_{11} - e_{12}) \quad (18),$$

where $$G_2 = (R_{15}/R_{16} + R_{17}) = R_{14}/R_{13}.$$

Hence, by equations (15), (16), (17) and (18), the following equation is given:

$$e_{13} = G_2T(\alpha_{11}Ra + \frac{k}{q} \ln \frac{\alpha_{11}T}{I_L} \cdot \frac{I_{sd}}{I_{sc}}) \quad (19),$$

where $$\alpha_{11} = \frac{1}{R12} \cdot \frac{k}{q} \ln \frac{R11}{R10} \cdot S_2.$$

Assuming that the transistors Q3 and Q4 differ only in their emitter junction areas but are identical in the other characteristics, $I_{sd}/I_{sc}$ equals the ratio between the junction areas of the two transistors and if $I_{sd}/I_{sc} = S_3$, equation (19) may be rewritten as:

$$e_{13} = G_2T(\alpha_{11}Ra + \frac{k}{q} \ln \frac{\alpha_{11}T}{I_L} \cdot S_3) \quad (20)$$

On the other hand, let $I_{E5}$ and $I_{E6}$ be the emitter currents of the transistors Q5 and Q6 and $i_0$ be the current flowing through the resistors R18, R19, ..., R23, and assume that this current is not shunted to the comparator circuit 15. Then, $$I_{E5}R24 = I_{E6}R25 \quad (21)$$

and $$I_{E6}R25 + \frac{kT}{q} \ln \frac{I_{E6}}{I_{sf}} = I_{E5}R24 + \frac{kT}{q} \ln \frac{I_{E5}}{I_{se}} + R23(i_o + \frac{I_{E5}}{1 + h_{FE5}}) \quad (22),$$

where $I_{E6} \gg I_{sf}$, $I_{E5} \gg I_{se}$, $h_{FE5}$ is the direct current amplification factor of the transistor Q5, and $I_{se}$ and $I_{sf}$ are the reverse saturation currents in the emitter junctions of the transistors Q5 and Q6. Control is effected by the operational amplifier 14 so as to satisfy equations (21) and (22) and hence, the following relation is given by equations (21) and (22):

$$i_o = \frac{1}{R23} \frac{kT}{q} \ln \frac{R24}{R25} \frac{I_{se}}{I_{sf}} - \frac{I_{E5}}{1 + h_{FE5}} \quad (23)$$

Assuming that the transistors Q5 and Q6 differ only in their emitter junction areas and are identical in the other characteristics, $I_{se}/I_{sf}$ equals the ratio between the junction areas of the two transistors and hence, if $I_{se}/I_{sf} = S_4$ and if each value is determined so that $$\frac{1}{R23} \cdot \frac{kT}{q} \ln \frac{R24}{R25} S_4 \gg \frac{I_{E5}}{1 + h_{FE5}},$$

then equation (23) may be rewritten as:

$$i_o = \frac{1}{R23} \cdot \frac{kT}{q} \ln \frac{R24}{R25} \cdot S_4 \quad (24)$$

Thus, the voltages produced at the respective junctions between the resistors R18, R19, ..., R23 are proportional to the absolute temperature and applied as a plurality of reference voltages for the comparator circuits 15. These reference voltages are selected as the voltages corresponding to the boundary points, for example, at exposure values such as +1 step, +0.2 step, −0.2 step and −1 step. The $Ev$ value of the subject to be photographed and the $Ev$ value of the exposure determining device 20 are operated and put out from the output terminal of the operational amplifier 13 at the voltage value as shown by equation (20), and applied as a common input to the comparator circuits 15. This voltage is compared with the reference voltage which indicates a proper exposure, and the result of the comparison is indicated by the indicator 16. That is, if the variable resistor $Ra$ is adjusted so that the reference voltage determining the proper exposure point becomes $$V_y = a_{12}T \tag{25}$$

where $a_{12}$ is a contant, and that $e_{13} = V_y$, then the following equation is given by equations (20) and (25):

$$Ra = \frac{1}{a_{11}} \left( \frac{a_{12}}{G_2} - \frac{k}{q} \ln \frac{a_{11}T}{I_L} \cdot S_3 \right) \tag{26}$$

Therefore, if the photocurrent $I_L$ is given, $Ra$ will be primarily determined and accordingly, the mechanical input for moving the variable resistor $Ra$, namely, the $Ev$ value of the exposure determining device 20 will be primarily determined. If the $Ev$ value of the subject or the photocurrent $I_L$ and $Ra$ or the $Ev$ value of the exposure determining device 20 are pre-combined so as to satisfy the proper exposure condition, proper exposure during manual exposure control may always be ensured by moving the resistor $Ra$ in accordance with the indication by the indicator 16.

Automatic exposure control is accomplished with a negative feedback applied to the variable resistor $Ra$ so that the electromechanical converter 17 may satisfy equation (26) by the signal from the comparator circuit 15.

Equation (26) contains the term of the absolute temperature T, but the influence thereof is low and shown in equation (9).

It is apparent that the resistance value of the variable resistor $Ra$ is linearly varied in the same manner as shown by equation (10).

Figure 3:
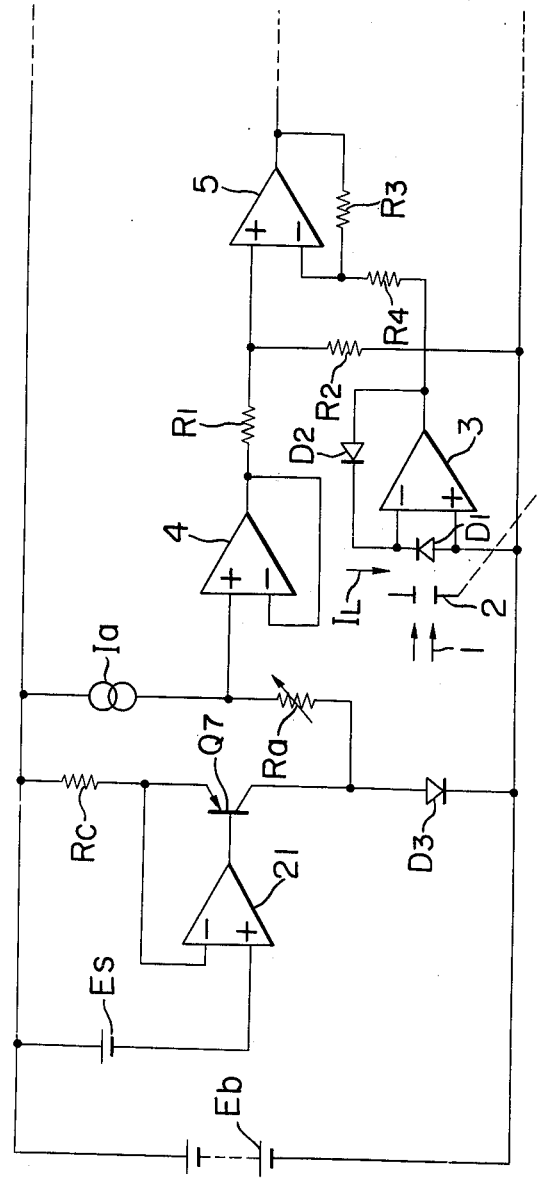
FIG. 3 is a circuit diagram of a thid embodiment of the present invention.

FIG. 3 shows a third embodiment of the present invention in which the T in equation (7') described in connection with FIG. 1 is eliminated.

The reference characters similar to those in FIG. 1 are functionally similar and unnecessary parts to be explained are omitted.

In FIG. 3, the voltage of the referential constant voltage source $Es$ is not variable with temperature or the like.

An operational amplifier 21, a referential voltage source $Es$, a resistor $Rc$ and a transistor Q7 together constitute a constant current source, and the collector current $I_{C7}$ of the transistor Q7 is not variable with temperature. Therefore, currents $I_{C7}$ and $Ia$ flow to the diode D3. The output voltage $e_1$ of the operational amplifier 4 is:

$$e_1 = a_1 TRa + \frac{kT}{q} \ln \frac{a_1 T + I_{C7}}{I_{s1}} \tag{27}$$

If the constant is pre-selected such that $a_1 T \ll I_{C7}$, $$e_1 = a_1 TRa + \frac{kT}{q} \ln \frac{I_{C7}}{I_{s1}} \tag{28}$$

By equations (2), (3) and (28), the following equation is given:

$$e_3 = GT(a_1 Ra + \frac{k}{q} \ln \frac{I_{C7}}{I_L} S1) \tag{29}$$

Since equation (29) equals equation (6), $$I_L = I_{C7} S1 \exp \frac{q}{k} (a_1 Ra - \frac{Rba_2}{G}) \tag{30}$$

This means that there is no variation with temperature.

According to the third embodiment of the present invention, the constant current which satisfies the relation $I_{C7} \gg a_1 T$ is shown to the diode D3 to eliminate the influence of the temperature dependency term $a_1 T$ which remains in the first embodiment, whereby there is provided a metering device which is less affected by temperature variation than the device of the first embodiment.

Further, the first embodiment is designed such that currents $I_{C7}$ and $Ia$ flow to the diode D3, but the same result may be obtained by such a design that only the current $I_{C7}$ flows to the diode D3.

A fourth embodiment of the present invention will be described.

The fourth embodiment is a metering device which is entirely the same in circuit arrangement as the first embodiment shown in FIG. 1 but higher temperature compensation is accomplished in a different manner from that of the first embodiment. Thus, the description of the circuit arrangement and the description of up to equation (2) are entirely identical to what has been described above, and the description of the present embodiment will only be started from equation (3) and subsequent equations.

The output voltage $e_3$ of the operational amplifier 5 is the amplified difference between the output voltages $e_1$ and $e_2$ of the operational amplifiers 4 and 3, and may be expressed as:

$$e_3 = \frac{R2}{R4} \cdot \frac{R4 + R3}{R1 + R2} \cdot e_1 - \frac{R3}{R4} e_2$$

$$= \frac{R3}{R4} \left( \frac{R2}{R3} \cdot \frac{R4 + R3}{R1 + R2} \cdot e_1 - e_2 \right)$$

If $R3/R4 = G$, $$\frac{R2}{R3} \cdot \frac{R4 + R3}{R1 + R2} = X$$

($X = 1$ in the first, second and third embodiments.)
Hence, $$e_3 = G(Xe_1 - e_2) \tag{31}$$

By equations (1), (2) and (31), the following equation is given:

$$e_3 = GT\left( XRa\alpha_1 + \frac{k}{q} \ln \frac{(\alpha_1 T)^X}{I_L} \cdot \frac{I_{s2}}{(I_{s1})^X} \right) \quad (32)$$

Assuming that the diode D2 and D3 differ only in their junction areas and are identical in the other characteristics, the junction area ratio S of these two diodes is:

$$S_1 = I_{s2}/I_{s1} \quad (33)$$

From equations (32) and (33), the following is derived:

$$e_3 = GT\left( XRa\alpha_1 + \frac{k}{q} \ln \frac{(\alpha_1 T)^X}{I_L} S_1 \cdot I_{s1}^{(1-X)} \right) \quad (34)$$

On the other hand, if the output current $Ib_1$ of the current source $Ib$ proportional to the absolute temperature is $$Ib_1 = \alpha_2 T,$$

where $\alpha_2$ is a constant and T is the absolute temperature, then the output voltage $e_4$ of the operational amplifier 6 will be:

$$e_4 = Rb\alpha_2 T \quad (35)$$

If there is a difference between the voltages $e_3$ and $e_4$, the motor 7 will control the stop device 2 to bring about the relation $e_3 = e_4$ in accordance with the resistance value of the variable resistor R4 for introducing the exposure determining factors, and apply a negative feedback so that the photocurrent of the photodiode D1 may equal a predetermined value, namely, the intensity of illumination on the photodiode D1 and the film surface. Thus, from equations (34) and (35), the photocurrent $I_L$ is maintained as follows:

$$I_L = (\alpha_1 T)^X \cdot S_1 \cdot I_{s1}^{(1-X)} \exp \frac{q}{k} (XRa\alpha_1 - \frac{Rb\alpha_2}{G}) \quad (36)$$

Consequently, proper intensity of illumination on the film surface may always be ensured in accordance with the resistance value of the variable resistor Ra for introducing the exposure factors, thereby enabling automatic exposure. The introduction of the exposure factors need not always be done through the variable resistor Ra, but may also be through Rb, $\alpha_1$ and $\alpha_2$ as shown by equation (8).

Consideration will now be given to the variations in $e_1$ and $e_2$ with temperature for a constant brightness of the subject to be photographed, namely, the variations in intensity of illumination with temperature on the photodiode D1 and the film surface, and further the variation in exposure value with temperature.

The reverse saturation current $I_{s1}$ of the diode D3 in equation (36) is generally expressed by the following approximation.

$$I_{s1} = A\exp(-\frac{Eg}{kT}) = A\exp(-\frac{B}{T}) \quad (37)$$

where Eg is the energy gap eV of the semiconductor material, A the positive constant determined by the construction of the diode, and B the positive constant determined by the energy gap of the semiconductor material.

If the diodes D2 and D3 are silicon diodes, the energy gap Eg is 1.21 eV and so, B = 1.4042 × 10⁴K.

Hence, by equations (36) and (37), the following is given:

$$I_L = (\alpha_1 T)^X \cdot S1 \cdot \left( A\exp(-\frac{B}{T}) \right)^{(1-X)} \cdot \exp \frac{q}{k} (XRa\alpha_1 - \frac{Rb\alpha_2}{G}) \quad (38)$$

Further, the variation with temperature in photocurrent of the photodiode D1 is usually of the order of $+0.14$ to $+0.2$ (%/° C), so that $I_L$ is:

$$I_L = C \cdot L(1 + D \cdot \Delta T) \quad (39)$$

where C is the conversion coefficient with which the intensity of illumination on the photodiode D1 is converted into a current, L the intensity of illumination on the photodiode D1, D the temperature coefficient of the photocurrent, and $\Delta T$ the temperature variation with respect to the reference temperature.

From equations (38) and (39), the following is derived:

$$L = \frac{(\alpha_1 T)^X \cdot S1 \left( A\exp(-\frac{B}{T}) \right)^{(1-X)} \cdot \exp \frac{q}{k} (XRa\alpha_1 - \frac{Rb\alpha_2}{G})}{C(1 + D \cdot \Delta T)} \quad (40)$$

The variation in exposure value, $\Delta Ev$, for the temperature change from the reference temperature $T_1$ to temperature $T_2$, is expressed as:

$$\Delta Ev = \frac{\ln \frac{L(T2)}{L(T1)}}{\ln 2} \quad (41)$$

Hence, from equations (40) and (41), $$\Delta Ev = \frac{1}{\ln 2} \cdot \ln \left( (\frac{T2}{T1})^X \cdot \exp(1-X) \cdot B(\frac{1}{T1} - \frac{1}{T2}) \cdot \frac{1}{1 + D(T2 - T1)} \right) \quad (42)$$

$$= \frac{1}{\ln 2} \left( X \cdot \ln \frac{T2}{T1} + (1 + X) \cdot B(\frac{1}{T1} - \frac{1}{T2}) - \ln(1 + D(T2 - T1)) \right)$$

Figures 5, 6:
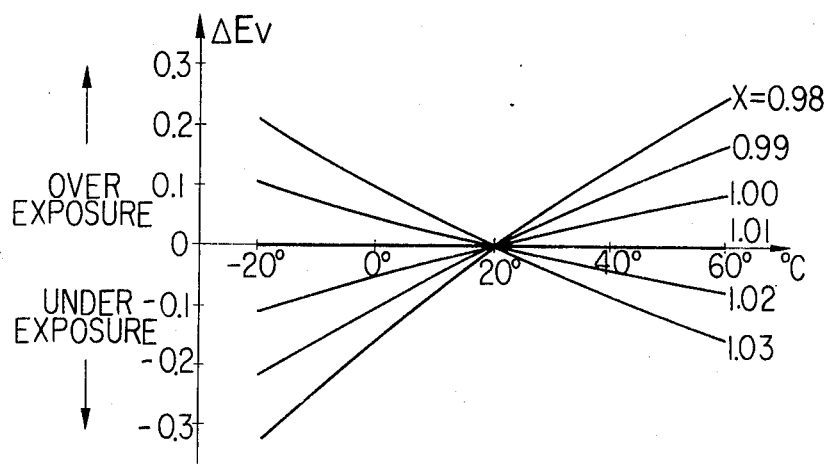
FIG. 5 is a table for illustrating the fourth embodiment of the present invention.
FIG. 6 is a graph for illustrating the fourth embodiment of the present invention.

When the reference temperature $T_1$ = 293 (° K), B = 1.4042 × 10⁴(K) and D = 0.0017 (1/K), the variations in exposure value, $\Delta Ev$, at the respective temperatures with X as parameter are shown in FIG. 5 and graphically illustrated in FIG. 6.

Thus, for the aforementioned constants, if X = 1.01, the variation in exposure value with temperature variation may be made substantially null.

More specifically, in the present embodiment, by constituting the circuit as described above, adopting different resistance values for the external resistors R1, R2, R3 and R4 of the differential amplifier comprising the operational amplifier 5 and said external resistors R1 – R4, and setting the ratio therebetween, $$X = \frac{R2}{R3} \cdot \frac{R4 + R3}{R1 + R2},$$

to an optimum value so that the variation is exposure value for temperature variation is substantially null, it is possible to obtain a metering device which is less affected by the temperature dependency term $a_1T$ shown in equation (7') which remains in the first and second embodiments previously described.

Since G is a term for providing the differential amplifier with a desired amplification factor, the ratio of R3 to R4 may be determined as desired, whereas the ratio of R1 to R2 is given as:

$$\frac{R1}{R2} = \frac{\frac{1}{G} + 1}{X} - 1$$

Thus, X may be substituted for by an optimum value (in the example shown in FIG. 5, X = 1.01).

Figure 7:
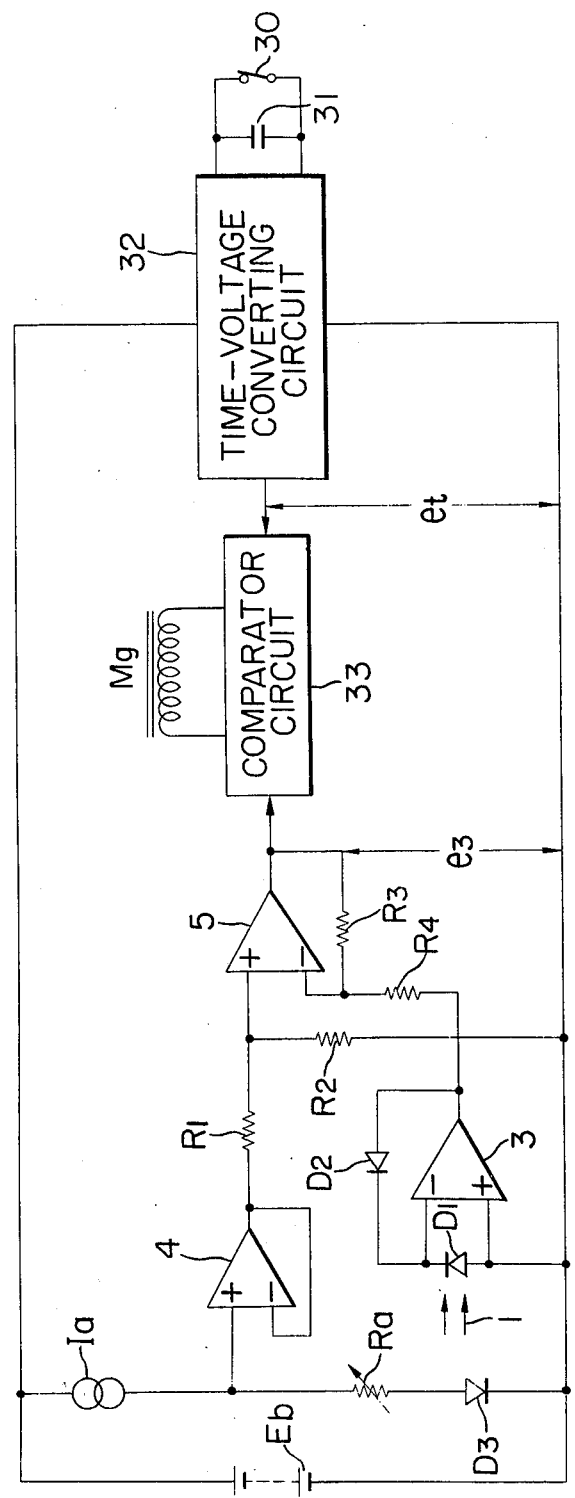
FIG. 7 is a circuit diagram of a fifth embodiment of the present invention.

FIG. 7 shows a fifth embodiment of the present invention as applied to an electric shutter. Those parts which are functionally similar to those in the embodiments described above are given similar reference characters and need not be described. The present embodiment is a TTL metering device.

In FIG. 7, when an unshown shutter is opened, an integration starting switch 30 is opened to charge an integrating capacitor 31.

The charging voltage of this capacitor is converted into a voltage $e_t$ proportional to the absolute temperature which is expressed as:

$$e_t = G \cdot \frac{kT}{q} \ln a_3 t \quad (43),$$

where $a_3$ is a constant and $t$ is the time which has elapsed from opening of the switch 30, namely, the exposure time. The voltage $e_t$ is applied to one of the input terminals of a comparator circuit 33. The other input terminal of the comparator circuit 33 receives the output voltage $e_3$ of the operational amplifier 5. The voltage $e_t$ rises with lapse of time, and when $e_3$ and $e_t$ become equal, the comparator circuit 33 energizes an electromagnet Mg associated with the shutter closing operation of an unshown camera, thereby closing the shutter.

By adjusting the variable resistor $Ra$ for introducing the exposure determining factors to set the exposure condition, a proper exposure time is primarily determined by the intensity of illumination L on the photodiode D1 to thereby accomplish automatic exposure control.

By equations (34), (39) and (43), the relation between the intensity of illumination L on the photodiode D1 and the exposure time $t$ is given as:

$$L \cdot t = \frac{(a_1T)^X \cdot S1 \cdot I_{s1}^{(1-X)} \cdot \exp\frac{q}{k} X Ra a_1}{C(1 + D \cdot \Delta T)a_3} \quad (44)$$

Thus, the variation in exposure value with temperature, $\Delta Ev$, is similar to equation (42) and may be made substantially null by setting X in the described manner, whereby the temperature dependency of the logarithmic characteristic of the diode D2 may be compensated for.

Figure 4:
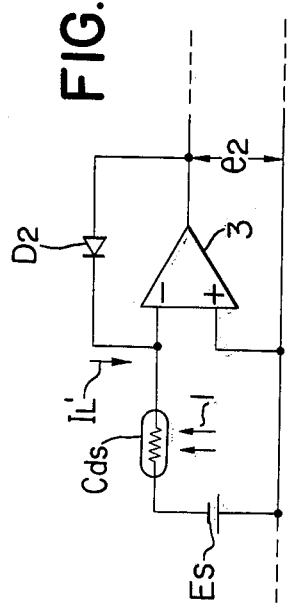
FIG. 4 is a circuit diagram showing a portion of another embodiment of the present invention.

In the first, second and third embodiments already described, the information on the brightness of the subject is introduced by the photocurrent produced from the photodiode, but such information may also be introduced by a photoconductor such as CdS or the like, as shown in FIG. 4. In FIG. 4, only the photodiode portion is changed from the first embodiment and the other circuit portions are not shown. In FIG. 4, Es designates a constant voltage source and CdS denotes a photoconductor having the following resistance value RcdS:

$$RcdS = Y \cdot Z^{-\gamma},$$

where Y and $\gamma$ are constants and Z is the intensity of illumination on the CdS Photoconductor. Since the CdS Photoconductor is falsely short-circuited by the operational amplifier 3, the value of the current flowing therein is:

$$I'_L = \frac{Es}{Y} Z^\gamma$$

The $I'_L$ is logarithmically converted by the diode D2.

The output $e_2$ of the operational amplifier 3 is:

$$e_2 = \frac{kT}{q} \ln \frac{I'_L}{I_{s2}} = \frac{kT}{q} \ln \frac{Es \cdot Z^\gamma}{Y I_{s2}} \quad (45)$$

As in the first embodiment of FIG. 1, the following equation is given by equations (1), (3) and (45):

$$e_3 = GT(a_1Ra + \frac{k}{q} \ln \frac{a_1 TY}{Es \cdot Z^\gamma} \quad (46)$$

Control is effected to bring about the relation $e_3 = e_4$, so that the following is given by equations (6) and (46):

$$Z = (\frac{a_1 TY}{Es})^{1/\gamma} \cdot \exp \frac{1}{\gamma} \frac{q}{k} (a_1 Ra - \frac{Rb a_2}{G}) \quad (47)$$

Thus, the output $e_2$ is controlled to the value of Z shown by equation (47).

The variation in exposure value with temperature, $\Delta Ev$, is:

$$\Delta Ev = \frac{\ln \frac{T_1}{T_2}}{\gamma \ln 2} \quad (48)$$

It is desirable that $\gamma$ be increased to reduce the influence of temperature.

In order to further reduce the temperature characteristic, X may be contained in the equation for the operation of differential amplification, as in equation (31). In that case, if the temperature characteristic of CdS is negligible, the equation for showing the variation in exposure value with temperature will be:

$$\Delta Ev = \frac{1}{\gamma \ln 2} \left\{ X \ln \frac{T_2}{T_1} + (1 - X) \cdot B \cdot \left( \frac{1}{T_1} - \frac{1}{T_2} \right) \right\}$$

Thus, the variation in exposure value with temperature may be minimized by setting X = 1.02.

Also, the variation $\Delta Ra$ in $Ra$ necessary to vary the exposure level by one step is:

$$\Delta Ra = \frac{\gamma k}{q \alpha_1} \ln 2$$

Consequently, the exposure determining factors may be introduced by a variable resistor which is linearly variable as in the first embodiment.

According to the present invention, as has hitherto been described, the term of the temperature-dependent reverse saturation current of the logarithmic conversion diode may be eliminated by a differential amplifier receiving as one input the value $e_1$ which is the sum of the voltage potential to the absolute temperature and the bias voltge produced by the diode and as the other input the value $e_2$ which is the quantity of light from the subject logarithmically converted into a voltage, and an operation less dependent on temperature may be provided by the output voltage of the differential amplifier being compared with the reference voltage proportional to the absolute temperature. Further, the capability of the differential amplifier portion providing a necessary amplification factor at the same time leads to the possibility of increasing the accuracy of the exposure meter. Also, the introduction of the exposure determining factors may be effected by a linearly variable resistor without resorting to any complicated functional relation and this is convenient.

I claim:

1. A metering device comprising:
    a photoelectric converter circuit for generating a first voltage corresponding to the brightness of a subject to be photographed, said photoelectric converter circuit including a photoelectric converter element and a first conductor element for logarithmically converting the output of said photoelectric converter element;
    a voltage generating circuit including a semiconductor element and a current source for providing a current proportional to an absolute temperature to a resistor connected in series to said second semiconductor element, said voltage generating circuit being effective to generate a second voltage comprising the sum of the voltages generated in said resistor and said second semiconductor element;
    a differential amplifier for amplifying the voltage difference between said first and second voltage;
    a voltage generating circuit for generating a third voltage proportional to the absolute temperature;
    a comparator circuit for comparing the output voltage of said differential amplifier with said third voltage; and
    means for equalizing the output voltage of said differential amplifier and said third voltage by the output of said comparator circuit.

2. A metering device according to claim 1, wherein said differential amplifier comprises an operational amplifier and a plurality of resistors, the resistance values of said resistors being selected such that the variation in exposure with temperature variation is minimized.

3. A metering device according to claim 1, wherein said resistor connected in series to said second semiconductor element comprises a variable resistor for introducing exposure determining factors.

4. A metering device according to claim 1, wherein said means for equalizing the output voltage of said differential amplifier and said third voltage by the output of said comparator circuit comprises a variable stop disposed in front of the photoelectric converter element assuming an intensity of illumination which is always at a predetermined ratio to the intensity of illumination on the surface of photograhic film.

5. A metering device according to claim 1, wherein said means for equalizing the output voltage of said differential amplifier and said third voltage by the output of said comparator circuit comprises a variable resistor operatively associated with exposure determining means and connected in series to said second semiconductor element.

6. A metering device according to claim 1, wherein said comparator circuit comprises a plurality of comparator circuits, said third voltage comprises a plurality of different voltages, the output voltage of said differential amplifier provides a common input to said plurality of comparator circuits, said plurality of third voltages are connected as reference voltages to the other input terminals of said comparator circuits, and indicator means is provided which is driven by the outputs of said plurality of comparator circuits.

7. A metering device comprising:
    a photoelectric converter circuit for generating a first voltage corresponding to the brightness of a subject to be photographed, said photoelectric converter circuit including a photoelectric converter element and a first conductor element for logarithmically converting the output of said photoelectric converter element;
    a voltage generating circuit comprising a constant current source including a second semiconductor element for providing a constant current to said second semiconductor element, a resistor, and said constant current source flowing to said resistor a current proportional to an absolute temperature, said voltage generating circuit being effective to generate a second voltage which is the sum of the voltage produced in said second semiconductor element and the voltage produced in said resistor;
    a differential amplifier for amplifying the voltage difference between said first and second voltage;
    a voltage generating circuit for generating a third voltage proportional to the absolute temperature;
    a comparator circuit for comparing the output voltage of said differential amplifier with said third voltage; and
    means for equalizing the output voltge of said differential amplifier and said third voltage by the output of said comparator circuit.

8. A metering device according to claim 7, wherein said resistor forming the circuit for generating said second voltage to which said voltage proportional to the absolute temperature flows comprises a variable resistor for introducing exposure determining factors.

9. A metering device comprising:
    a photoelectric converter circuit for generating a first voltage corresponding to the brightness of a subject to be photographed, said photoelectric converter circuit including a photoelectric converter element and a first conductor element for logarithmically converting the output of said photoelectric converter element;

a voltage generating circuit including a second semiconductor element and a current source for providing a current proportional to an absolute temperature to a resistor connected in series to said second semiconductor element, said voltage generating circuit being effective to generate a second voltage comprising the sum of the voltage generated in said resistor and said second conductor element;

a differential amplifier for amplifying the voltage difference between said first and second voltage;

a time-voltage converter circuit including an integrating capacitor adapted to operate in response to opening of a camera shutter to thereby convert time into a logarithmic function and put out a third voltage proportional to the absolute temperature;

a comparator circuit for comparing the output voltage of said differential amplifier with said third voltage; and means for effecting the operation for the shutter when the output of said differential amplifier and said third voltage have been equalized by said comparator circuit.

* * * * *

UNITED STATES PATENT AND TRADEMARK OFFICE
CERTIFICATE OF CORRECTION

PATENT NO. : 4,072,962
DATED : February 7, 1978
INVENTOR(S) : OSAMU MAIDA

It is certified that error appears in the above-identified patent and that said Letters Patent are hereby corrected as shown below:

Column 1, line 61, change "thid" to -- third --.

Column 8, Equation (19), kindly change the same from

" $e_{13} = G_2T(\alpha_{11}Ra + \frac{k}{q} \ln \frac{\alpha_{11}T}{I_L} \cdot \frac{I_{Isd}}{I_{sc}} \ldots (19),$" to -- $e_{13} = G_2T(\alpha_{11}Ra + \frac{kl}{q} n \frac{\alpha_{11}T}{I_L} \cdot \frac{I_{sd}}{I_{sc}} \ldots (19),$ --.

Column 15, line 47, before "semiconduc-" insert --second--.
Column 16, line 37, change "conductor" to -- semiconductor --.
Column 17, line 2, change "conductor" to -- semiconductor --; line 15, change "conductor" to -- semiconductor --.

Signed and Sealed this

Eighth Day of January 1980

[SEAL]

Attest:

SIDNEY A. DIAMOND

Attesting Officer

Commissioner of Patents and Trademarks